United States Patent [19]

Nakaya

[11] Patent Number: 5,141,038

[45] Date of Patent: Aug. 25, 1992

[54] APPARATUS FOR FEED CONTROLLING IN A CENTERLESS VENEER LATHE

[75] Inventor: Takashi Nakaya, Obu, Japan

[73] Assignee: Meinan Machinery Works, Inc., Obu, Japan

[21] Appl. No.: 725,434

[22] Filed: Jul. 3, 1991

[30] Foreign Application Priority Data

Jul. 6, 1990 [JP] Japan .................. 2-179938

[51] Int. Cl.[5] .................................. B27L 5/02
[52] U.S. Cl. ........................ 144/213; 144/209 R; 144/357; 144/365
[58] Field of Search .............. 144/209 R, 213, 213 A, 144/356, 357, 365

[56] References Cited

U.S. PATENT DOCUMENTS

| | | | |
|---|---|---|---|
| 4,262,716 | 4/1981 | Hasegawa | 144/213 |
| 4,708,180 | 11/1987 | Browning, Jr. et al. | 144/357 |
| 4,893,663 | 1/1990 | Ely | 144/357 |
| 4,901,777 | 2/1990 | Kolke | 144/213 |

*Primary Examiner*—W. Donald Bray
*Attorney, Agent, or Firm*—Brooks Haidt Haffner & Delahunty

[57] ABSTRACT

An apparatus for controlling the knife carriage feed is disclosed herein which is applicable to a centerless type veneer lathe wherein a peeler log is driven to rotate by peripheral drive system without use of conventional spindles. The apparatus includes a roll which is engageable with the peripheral surface of a log to be rotated thereby for measuring the current log peripheral speed and a device connected to a carriage feeding screw for monitoring the current log diameter. The knife carriage feed is effected in accordance with the log rotational speed which is determined by the current log diameter and the current log peripheral speed so that a veneer knife on the carriage cuts into the log peripheral surface for a predetermined distance for each turn of said log.

7 Claims, 2 Drawing Sheets

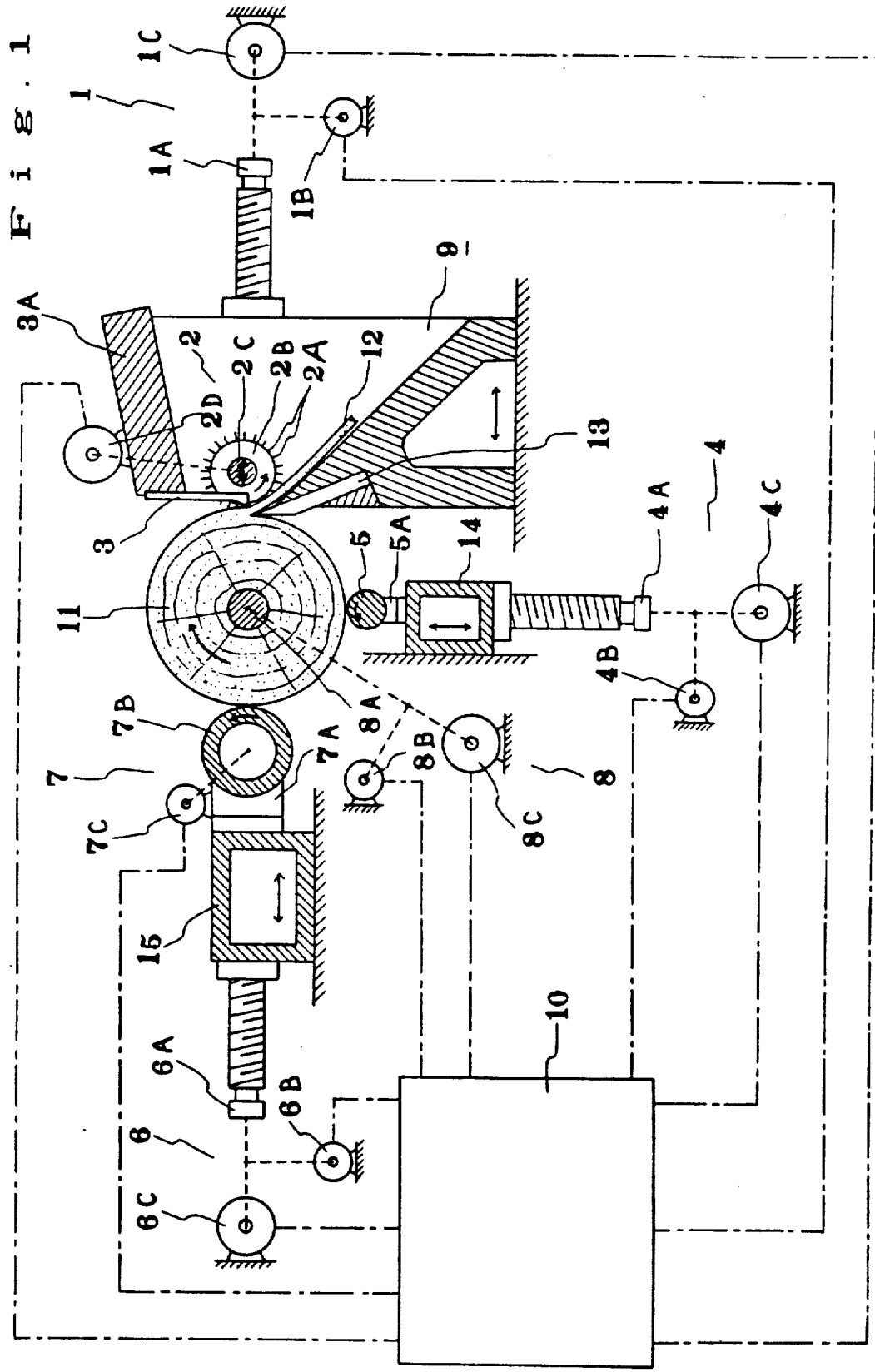

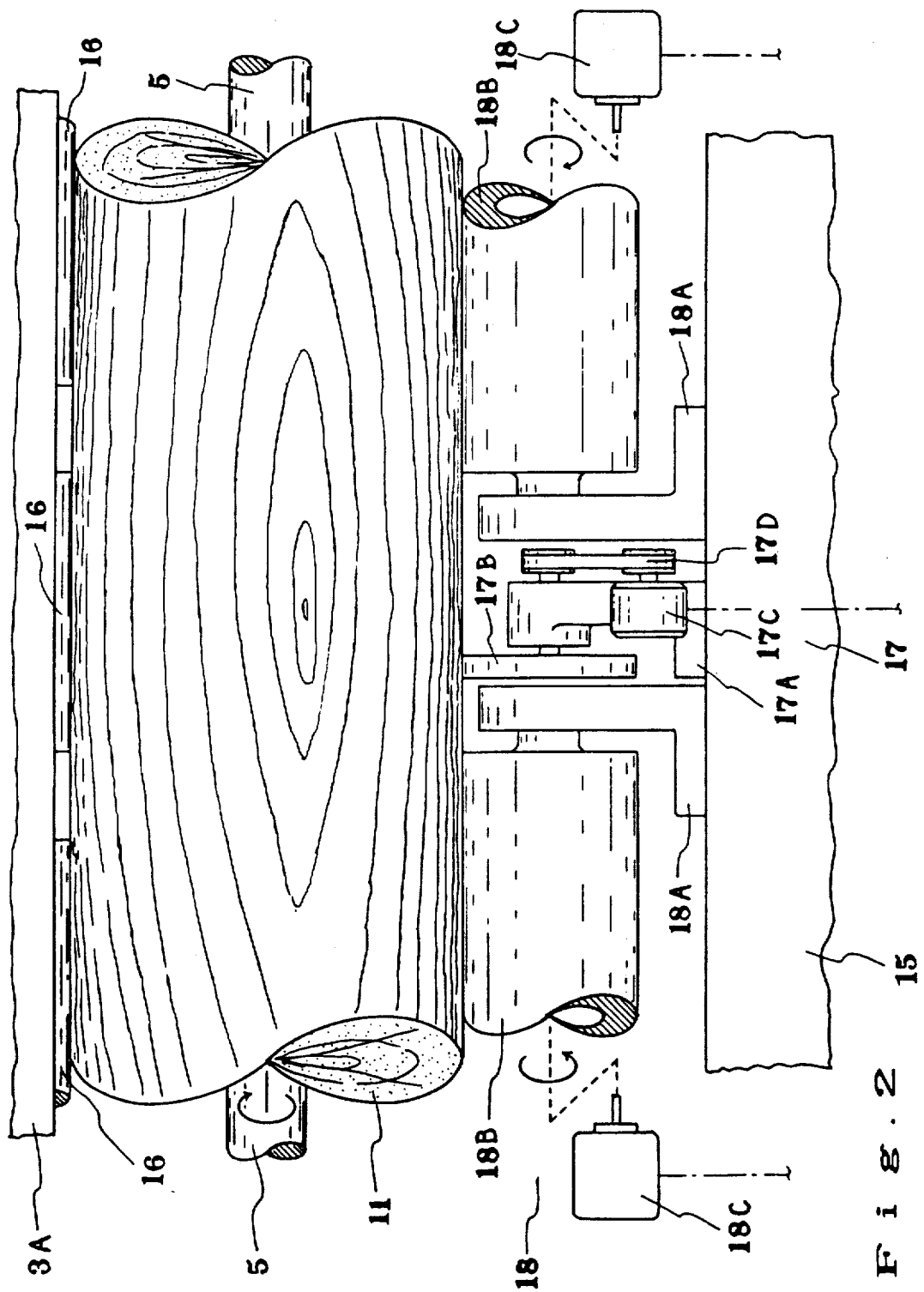

APPARATUS FOR FEED CONTROLLING IN A CENTERLESS VENEER LATHE

FIELD OF THE INVENTION

The present invention relates to a rotary veneer lathe for peeling wood veneer from a rotating log. More specifically, it relates to an apparatus for controlling the feed of a veneer knife mounted on a knife carriage in a centerless type veneer lathe which is operable without use of spindles.

BACKGROUND OF THE INVENTION

Various centerless or spindleless type rotary veneer lathes have been proposed which use a peripheral drive system together with a pair of spindles, or even dispense with the spindles, for applying turning torque to drive a peeler log in peeling wood veneer therefrom. In a veneer lathe without spindles, a peeler log is driven by the peripheral drive system which is designed specifically to apply the turning torque necessary to rotate the log on its axis from log's outer periphery. In a veneer lathe equipped with both the peripheral drive and the spindles, on the other hand, it is a usual practice that the log is supported and driven from its opposite axial ends by the spindles at least during an early period of the peeling operation and, at any suitable time during the peeling, the log drive is switched from the center drive spindles to the peripheral drive with the spindles then retracted from engagement with the log ends. In view of today's requirement of improvement in veneer yield and recent scarcity of large-diameter logs for veneer peeling, the veneer lathes of the above centerless type can offer important advantages to veneer and plywood mills in that small-diameter logs can be handled successfully and the final diameter to which a log can be peeled will not be restricted by diametral size of the spindles and hence the diameter of a core log resulting from veneer peeling can be reduced.

To peel veneer sheet with a predetermined thickness in a center-drive veneer lathe using conventional spindles, the feedrate, or the rate at which a veneer peeling knife carried on a movable knife carriage is fed into the log, is controlled in close relation to the spindle speed in terms of rpm. More specifically, the knife carriage is advanced for a predetermined distance, which equals the above predetermined thickness of veneer sheet to be peeled, for each turn of the log, hence each turn of the spindles. In a centerless type veneer lathe operation in which spindles, if any, are disengaged from the log at least during the later part of the veneer peeling operation and, therefore, the above feed controlling cannot be employed when the spindles are rendered inoperative, it has been customary to feed the knife carriage at a rate which is adjusted in accordance with the theoretical rotational speed of the log that can be figured out from the surface or peripheral speed of the log, which substantially equals the peripheral speed of the drive members of the peripheral drive system, and the current log diameter during peeling.

When the peripheral drive system uses rolls or discs as the drive members which are set in frictional engagement with the log periphery to drive the log, actual log speed may fail to coincide with its theoretical speed because of possible slippage between the drive members and the log periphery. Even with use of a peripheral drive system employing spiked wheels as the drive members, each having a number of radially projecting spikes incising into the log peripheral surface in driving the log, similar differences in peripheral speed between the log and the drive wheels may occur because of the varying incising depths of the spikes due to variations in hardness along the log surface. Insofar as the feed controlling is dependent on the above theoretical speed, not the actual speed, of a log, it is unavoidable in either type of drive that the feedrates of the knife carriage tend to become inaccurate, thereby to invite errors in the thickness of veneer sheet being peeled by a centerless type lathe.

Since it is practically impossible for a lathe operator to visually recognize the above slippage or the variations in relative speeds between the driving members and the log and also the variations in veneer sheet thickness caused by other various factors, the above problem inherent in centerless veneer lathes has been overlooked.

SUMMARY OF THE INVENTION

Therefore, an object of the present invention is to provide an apparatus for controlling the feed in a centerless type veneer lathe, which can make possible accurate feeding of the knife carriage to improve uniformity in the thickness of veneer sheet being peeled by the lathe.

According to the present invention, there is provided a veneer lathe comprising a peripheral drive system for rotating a peeler log from the periphery thereof at a substantially constant peripheral speed, mechanism for feeding a knife carriage having a veneer knife carried thereon toward the log at controlled variable feedrates, means for detecting the current diameter of the log which is decreasing as the veneer peeling proceeds, means for measuring the current peripheral speed of the log and control means for adjusting the knife carriage feedrate.

The control means is operable to adjust the feedrate in accordance with the log rotational speed which is determined by the current diameter and current peripheral speed of the log so that the veneer knife cuts into the log peripheral surface for a predetermined distance for each turn of the log. That is, the feed is effected on the basis of the current rotational speed of the log which can be figured out by the control means from the current log peripheral speed which is measured by the measuring means and the current diameter of the log which is determined by the detecting means. The log diameter can be detected by monitoring the rotation of a feed screw used in the feeding mechanism, while the log peripheral speed is measured by a rotary encoder which is operatively connected to a rotatable roll arranged in contacting relation with the periphery of the log to be driven thereby.

When the peripheral drive is used in conjunction with a pair of conventional spindles, feed control may be performed directly on the basis of the spindle speed which equals the rotational speed of log, insofar as the spindles are engaged with the axial ends of the log.

By so arranging the centerless type veneer lathe, inaccurate feeding resulting from slippage between the log periphery and drive members of the peripheral drive system and also from the varying incising depths of spikes of the drive wheels, if such drive members are used, can be prevented successfully since the knife carriage feed is adjusted on the basis of the actual log speed, with the result that uniformity in veneer sheet thickness can be improved.

For the purpose of description, a centerless type veneer lathe described herein shall cover both veneer lathes which employ a peripheral drive system together with the spindles and those which dispense with the spindles, for applying turning torque to drive a peeler log in peeling wood veneer therefrom.

The above and other objects, features and advantages of the present invention will become apparent to those skilled in the art from the following description of embodiments of an apparatus for knife carriage feeding in a centerless veneer lathe, which description is made with reference to the accompanying drawing, wherein:

BRIEF DESCRIPTION OF THE DRAWINGS

FIG. 1 is a schematic side view showing a preferred embodiment of a centerless veneer lathe which incorporates therein a feed controlling apparatus according to the present invention; and FIG. 2 is a partial plan view showing another embodiment of the centerless veneer lathe.

DETAILED DESCRIPTION OF THE EMBODIMENTS

Referring to FIG. 1 showing the preferred embodiment according to the invention, reference numeral 1 generally designates a feed mechanism of a centerless type veneer lathe equipped with peripheral drive system 2 and center drive system 8, both of which will be described in detail hereinafter. The feed mechanism 1 includes a pair of rotatable feed screws 1a (only one being shown) engaged with a knife carriage 9 carrying a veneer knife 13 thereon, a variable-speed drive 1c such as a servomotor for rotating the feed screw 1a in either direction to move the knife carriage 9 along guide ways (not shown) toward and away from a log 11, as indicated by the double-headed arrow, and a rotary encoder 1b connected to either one of the feed screws 1a for monitoring the rotation of the screw thereby to detect the current position of the knife carriage 9. As indicated by dash-and-dot lines, the rotary encoder 1b has an output connected to a control unit 10 for transmitting thereto information representative of the current knife carriage position. The motor 1c is also connected to the control unit 10 and operation of the motor 1c is controlled, as will be described in detail in a later part hereof, by the control unit so as to move the knife carriage 9 at any desired controlled feedrate or at a rapid rate.

The peripheral drive system 2 for rotating the log 11 from its periphery includes a plurality of drive wheels 2b (only one being shown) supported at axially spaced intervals on a common drive shaft 2c which is yieldably supported, as indicated by double-headed arrow, by a frame member of the lathe and each having a number of spikes 2a engageable with the peripheral surface of the log 11 adjacent the cutting edge of the veneer knife 13, and a constant-speed drive 2d, e.g. a three-phase induction motor, for driving the drive shaft 2c at a constant speed in the arrow direction (the counterclockwise direction as seen in FIG. 1). The motor 2d is connected to the control unit 10 so that the motor operation is controlled thereby.

Reference numeral 3 depicts a plurality of sectioned pressure bars (only one being shown) mounted by a support block 3a and each positioned between any two adjacent drive wheels 2b for applying pressure to the log 11 adjacent the position where the cutting edge of the knife 13 is engaged with the log 11 so as to prevent advance splitting in peeling veneer from the log.

Reference numeral 4 designates a screw mechanism for moving backup rolls 5, comprising a plurality of rotatable lead screws 4a (only one being shown) engaged with a support block 14 slidably mounted in a frame member of the lathe, a variable-speed drive 4c such as a servomotor for rotating the lead screws 4a thereby to move the block 14, and a rotary encoder 4b connected to any one of the lead screws 4a for monitoring the rotation thereof. The motor 4c and the rotary encoder 4b are connected to the control unit 10.

The backup rolls 5 are freely rotatably mounted on the support block 14 via a bearing box 5a and movable into contact engagement with the log periphery at any desired time during the peeling operation so as to support or back up the log 11 from its bottom for preventing the log from bowing because of its own weight. Operation of the motor 4c to rotate the lead screws 4a is controlled by the control unit 10 so that the backup rolls 5, when in contact engagement with the log periphery, are moved at controlled rates so as to maintain their engagement with the log periphery.

Reference numeral 6 designates a screw mechanism for moving a rotatable roll 7b for measuring the log's surface or peripheral speed. The screw mechanism 6 includes a lead screw 6a engaged with a support block 15 slidably mounted in a frame member of the lathe, a variable-speed drive 6c such as a servomotor for rotating the lead screw 6a thereby to move the block 15 in either of the double arrow directions, and a rotary encoder 6b for monitoring the rotation of the lead screw 6a. The motor 6c and the rotary encoder 6b are connected to the control unit 10 and operation of the motor to rotate the lead screw 4a is controlled by the control unit 10.

Reference numeral 7 shows a device for measuring the peripheral speed of rotating log 11. The device 7 includes the above mentioned roll 7b supported by the slidable block 15 via a bearing box 7a and contactable with the peripheral surface of rotating log 11 to be driven thereby, and a rotary encoder 7c connected to the roll 7b to measure the peripheral speed of the log 11. The rotary encoder 7c has an output connected to the control unit 10 for transmitting thereto information representative of the current log peripheral speed. The speed measuring roll 7b can serve also as a backup roll to support the log 11 from the lateral side opposite the drive wheels 2b to prevent the log 11 from being bent in the horizontal direction by the pressure exerted by the drive wheels 2b.

To ensure accurate measurement of log peripheral speed, the speed measuring roll 7b should be engaged with the log periphery with as little slippage as possible. For this purpose, the roll 7b should preferably be clad with materials such as rubber or abrasive paper or cloth, or formed with grooves or knurls so as to increase the coefficient of friction when in contact with the log peripheral surface.

The center drive system 8 comprises a pair of powered spindles 8a (only one being shown) arranged so as to hold the peeler log 11 at its opposite axial ends by way of chucks (not shown) mounted at the inner ends thereof and axially movable toward and away from the center of the log 11 so as to allow the chucks to be engaged with and disengaged from the log center. The spindles 8a are powered by a variable-speed motor 8c to drive the log 11 in the arrow direction. The motor 8c is connected to the control unit 10, and operation of the motor 8c is controlled by the control unit as will be described hereinafter. The center drive system 8 further includes a rotary encoder 8b connected to either one of the spindles 8a to monitor the rotational speed thereof and having an output connected to the control unit 10 to provide thereto information representative of the spindle speed.

The control unit 10 is adapted to process the information from the respective rotary encoders and generate signals accordingly to control the operation of the respective motors. The respective motors may be controlled independently during preparation for veneer peeling or after the veneer peeling operation is over. For example, in initially moving the knife carriage 9 toward a log by the feed mechanism 1, the log driving speed by the center spindles 8a and a rapid feed of the feed mechanism 1 may be established as required by the lathe operator.

The following will explain the operation of the veneer lathe incorporating the above-described feed controlling apparatus.

Before the peeling operation is initiated, a log having an irregular peripheral surface is held between the spindle chucks and driven to rotate at idle, at any desired speed in the arrow direction, by the spindles 8a with the knife carriage 9 and backup rolls 5, 7b retracted in their original positions, respectively. The motor 1c is started so as to rotate the feed screws 1a thereby to move the knife carriage 9 toward the rotating log at a desired rapid rate until the knife 13 on the knife carriage 9 is brought into cutting engagement with the log periphery, with simultaneous engagement of the drive wheels 2b of the peripheral drive system 2 with the log periphery, thus veneer peeling is started. After the knife 13 has been thus engaged with the log 10 for cutting, the motor 8c is operated to drive the spindles 8a at such variable speeds that correspond with the current log speed in terms of rpm effected by the peripheral drive system 2. That is, the spindles 8a are rotated at variable speeds which can be figured out by the control unit 10 from a substantially constant peripheral speed of the drive members 2b and the current diameter of the log 11, which diameter is decreasing progressively as the peeling proceeds and can be monitored by the rotary encoder 1b for detecting the current position of the knife carriage 9. Upon engagement of the knife 13 with the log periphery, on the other hand, the knife carriage 9 is moved toward the axial center of the log 10 at feedrates controlled in accordance with the spindle speed monitored by the rotary encoder 8b as has been practiced conventionally so that the veneer knife 13 cuts for a predetermined distance into the rotating log 11 for each turn of the spindles 8a.

At any convenient time during peeling operation, e.g. at a time just after the log 11 has been rounded to become substantially cylindrical, and also before the spindles 8a are retracted away from the log axial ends, the control unit 10 is operated to activate the motors 4c and 6c to move the backup roll 5 and speed measuring roll 7b at any desired rapid rate until they are brought into contact engagement with the log periphery, respectively. The positions to which the rolls 5, 7b should be moved at a rapid rate can be determined by the knife carriage 9 position, which is monitored by the rotary encoder 1b. The rotary encoders 4b, 6b are used to count the number of turns of the respective lead screws 4a, 6a necessary for their associated rolls 5, 7b to reach the log periphery. After contact engagement with the log periphery, the rolls 5, 7b are advanced toward the log axial center at the same rate as the feedrate of the knife carriage so that the rolls maintain engagement with the log periphery for backing up the log and measuring its peripheral speed, respectively. At any suitable time after the contact engagement of the rolls 5, 7b with the log periphery, the spindles are moved away from the log axial ends to their retracted inoperative positions.

During veneer peeling without use of the spindles 8a, the motor 1c is operated to feed the knife carriage 9 at the desired rate according to the current log speed in terms of rpm so that the knife 13 cuts into the rotating log 11 for an appropriate amount for each turn of the log 11. That is, the feed is effected according to the current log angular speed which can be figured out by the control unit 10 from the current log peripheral speed which is measured by the rotary encoder 7c and the current diameter of the log 11 which is determined by the rotary encoder 1b monitoring the current position of the knife carriage 9.

Such veneer peeling is continued until the log 11 has been peeled down to a small diameter. After peeling of a log has been completed, the knife carriage 9 and the rolls 5, 7b are retracted to their original positions, respectively, at rapid moving speeds.

As it is apparent to those skilled in the art, the feed mechanism for use in the invention should be of such a type that can permit fine and quick feedrate adjustment in response to changing log speed.

In the above-described embodiment, the rotary encoder 1a incorporated in the feed mechanism 1 is assigned to determine the current log diameter, but it is to be understood that either of the rotary encoders 4c, 7c is usable for the same purpose.

In the peripheral drive arrangement as used in the above embodiment of a centerless type veneer lathe, wherein each drive wheel 2b has peripheral spikes 2a incisable into the log peripheral surface and is mounted on the drive shaft 2c which is supported so as to permit its yieldable displacement as indicated by the double-headed arrow, there is very little fear of slippage between the drive wheels 2b and the log periphery because of the incising engagement and, also, as many spikes 2a on each drive wheel 2b as possible can be engaged with the log even at decreased diameter of the log being peeled. Thus, the use of spiked wheels 2b is advantageous for log driving stability.

With use of such peripheral drive wheels, however, incising depth of the spikes 2a into the log is varied when the drive shaft 2c is caused to be displaced by variations in hardness of the log peripheral surface. Accordingly, relative speeds between the log and the drive wheels 2b will vary, as pointed out earlier under the background of the invention.

As it is now apparent from the foregoing description of the preferred embodiment, knife carriage feeding can be accomplished accurately according to the present invention because the feed is effected on the basis of the actual log rotational speed which is determined from the measurement of log peripheral speed and the current log diameter. Thus, the feedrate in veneer peeling can be adjusted in close relation to the log speed and, therefore, errors in veneer sheet thickness due to inaccurate feedrate can be forestalled.

Referring to FIG. 2 showing another embodiment according to the invention, this differs most from the first embodiment in that the peripheral drive system 18 uses a plurality of sectional drive rolls 18b frictionally engageable with the log periphery on opposite sides of the knife carriage (not shown). The drive rolls 18b are supported by bearing boxes 17a and driven by three-phase induction motors 18c. Speed measurement device 17 includes a roll 17b contactable with the log periphery, rotatably supported by a bearing box 17a and connected to a rotary encoder 17c via a toothed belt 17d for transmitting the rotation of the roll to the rotary encoder. The sectional pressure bars 3 in the first embodiment are replaced by freely rotatable sectional pressure rolls 16. Though not shown in the drawing, there are provided a pair of spindles engageable with the axial ends of the log 11 and also a control unit which is adapted to control the knife carriage feed in substantially the same manner as in the first embodiment in accordance with information representative of log peripheral speed measured by the rotary encoder 17c and of the current log diameter. As is apparent to those skilled in the art, the peripheral surfaces of the drive rolls 18b may be clad with materials such as rubber or abrasive paper or cloth, or formed with grooves or knurls so as to increase the coefficient of friction when in contact with the log peripheral surface.

In this embodiment using the drive rolls 18b which are frictionally engaged with the log periphery to drive the log, slippage may occur between the rolls and the log periphery, thereby causing a difference between the log's theoretical speed and its actual speed. Because knife carriage feed is effected in this embodiment in the same manner as in the first embodiment, the feedrate in veneer peeling can be adjusted accurately in close relation to the log speed and variations in veneer sheet thickness can be prevented successfully.

While the invention has been described and illustrated specifically with reference to the above preferred embodiments, it is to be understood that the present invention can be practiced in various changes and modifications without departing from the spirit or scope thereof, as exemplified below. Though in the above embodiments feedrate controlling in dependence upon the speed measurement by rolls such as 7b or 17b is started after the spindles 8a have been disengaged from the log ends, it may be so arranged that such controlling is initiated before the spindle disengagement.

It is to be understood that the present invention is also applicable to known centerless veneer lathes having different configurations than the lathes described in relation to the above embodiments, e.g. a lathe having a plurality of drive members arranged at different circumferential positions around a log, or a lathe which dispenses with the spindles and hence is designed to receive or handle only those logs which have been already rounded.

What is claimed is:

1. A veneer lathe for peeling veneer from a log comprising:
    a peripheral drive for rotating said log from the periphery thereof in a given direction at a substantially constant peripheral speed;
    a movable knife carriage having a veneer knife carried thereon;
    means for feeding said knife carriage toward said log at controlled variable feedrates;
    means for monitoring current diameter of said log while the log diameter is being decreased as the veneer peeling proceeds;
    means engageable with said log on the peripheral surface thereof for rotation therewith for measuring current peripheral speed of said log;
    control means operable to adjust the knife carriage feedrate in accordance with the current log rotational speed which is determined by said monitored current diameter of the log and said measured current peripheral speed of the log so that said veneer knife cuts into the log peripheral surface for a predetermined distance for each turn of said log.

2. A veneer lathe according to claim 1, wherein said current log peripheral speed measuring means includes a roll member having a peripheral surface engageable in contact with said log peripheral surface.

3. A veneer lathe according to claim 2, wherein said roll member is formed on the peripheral surface thereof with material having high coefficient of friction when in contact engagement with said log periphery.

4. A veneer lathe according to claim 1, further comprising a pair of rotatable spindles engageable with said log at the axial opposite ends thereof for rotating said log while holding said log therebetween, said spindles being disengageable from said log ends in the middle of a veneer peeling operation, said control means including means responsive to the rotational speed of said spindles when said spindles are in engagement with said log for adjusting the knife carriage feedrate in accordance with the log rotational speed so that said veneer knife cuts into the log peripheral surface for a predetermined distance for each revolution of said log.

5. A veneer lathe according to claim 4, wherein said control means is operated to adjust the knife carriage feedrate responsive to said current rotational speed of the spindles before said spindles are disengaged from the log ends, and operated thereafter to adjust the feedrate responsive to said current diameter and current peripheral speed of the log.

6. A veneer lathe according to claim 1, further comprising means for backing up said log.

7. A veneer lathe according to claim 1, wherein said means for monitoring current diameter of said log comprises means coupled to said knife carriage for determining the position of said carriage.

* * * * *

UNITED STATES PATENT AND TRADEMARK OFFICE
CERTIFICATE OF CORRECTION

PATENT NO.   : 5,141,038
DATED        : August 25, 1992
INVENTOR(S)  : T. Nakaya It is certified that error appears in the above-identified patent and that said Letters Patent is hereby corrected as shown below:

Col. 1, line 22, after "from" insert --the--.

Col. 2, line 37, after "log" insert comma --,--.

Col. 4, line 12, after "thereof" insert period --.--; line 36, before "to" insert --6c--.

Col. 5, line 30, after "la" insert comma --,--.

Col. 6, line 35, "la" should read --1b--; line 37, "4c," should read --4b,--; line 49, "diameter" should read --diameters--.

Col. 7, line 7, "17a" should read --18a--; line 9, after "17b", delete "contactable" insert --engageable--; line 43, start new paragraph at "Though".

Signed and Sealed this

Twenty-sixth Day of October, 1993

Attest:

BRUCE LEHMAN

Attesting Officer

Commissioner of Patents and Trademarks